US006970545B2

(12) United States Patent
Hussain et al.

(10) Patent No.: US 6,970,545 B2
(45) Date of Patent: Nov. 29, 2005

(54) SYSTEM AND METHOD FOR COMPLETING PRIVATE OR UNKNOWN CALLS MADE TO A SUBSCRIBERS PRIVACY SCREENING SERVICE

(75) Inventors: Aamir M. Hussain, Marietta, GA (US); Scott C. Holt, Smyrna, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 10/364,382

(22) Filed: Feb. 12, 2003

(65) Prior Publication Data

US 2003/0123629 A1 Jul. 3, 2003

Related U.S. Application Data

(63) Continuation of application No. 09/372,746, filed on Aug. 10, 1999, now Pat. No. 6,553,109.

(51) Int. Cl.[7] .......................... H04M 3/42; H04M 7/00; H04M 1/56
(52) U.S. Cl. ............. 379/207.02; 379/229; 379/211.02; 379/142.05
(58) Field of Search ...................... 379/201.01–201.05, 379/207.02, 207.11, 207.13, 207.14, 207.15, 219, 220.01, 221.08–221.12, 229, 230, 210.02, 211.02, 212.01, 142.01–142.05, 211.01

(56) References Cited

U.S. PATENT DOCUMENTS 5,497,414 A    3/1996  Bartholomew
5,701,301 A    12/1997 Weisser, Jr.
5,838,774 A    11/1998 Weisser, Jr.
6,101,251 A  * 8/2000  Strickland ............... 379/213.01
6,141,409 A  * 10/2000 Madoch et al. ......... 379/207.02
6,233,325 B1 * 5/2001  Frech et al. ............ 379/142.06
6,424,702 B1 * 7/2002  Blumenschein et al. ... 379/67.1
6,496,569 B2 * 12/2002 Pelletier et al. .......... 379/88.21
6,625,270 B1 * 9/2003  Banwell et al. .............. 379/196

OTHER PUBLICATIONS

Bellcore, "LSSGR: Voiceband Data Transmission Interface Section 6.6 (GR–30–Core), "pp. v–vii, 2–1–2–5; Issue 2, Dec. 1998.

"Selective Cell Acceptance", http://www.paulbunyan.net/telephone/rates/features/selectcallaccept.html.

* cited by examiner

Primary Examiner—Benny Tieu
(74) Attorney, Agent, or Firm—Withers & Keys, LLC

(57) ABSTRACT

An advanced intelligent network system for managing and routing telephone calls from a calling party to a subscriber to a privacy screening service. The system routes the calls according to whether the calling party number is known and public, in which case the call is terminated in a routine manner; unknown, in which case the system plays an announcement asking the calling party to record his or her name; or known and private, in which case the system asks the caller for permission to override his or her privacy before routing the call to the subscriber. The advanced intelligent network system stores the subscriber's number in a display text field, thus enabling termination of the call to the subscriber irrespective of whether the subscriber number is private or public.

33 Claims, 13 Drawing Sheets

LEGEND:
SS7: SIGNALING SYSTEM 7
SSP: SERVICE SWITCHING POINT
STP: SIGNALING TRANSFER POINT
TAT: TERMINATION ATTEMPT TRIGGER
SN: SERVICE NODE
BRI: BASIC RATE INTERFACE LINE

LEGEND:
SS7: SIGNALING SYSTEM 7
SSP: SERVICE SWITCHING POINT
STP: SIGNALING TRANSFER POINT
TAT: TERMINATION ATTEMPT TRIGGER
SN: SERVICE NODE
BRI: BASIC RATE INTERFACE LINE

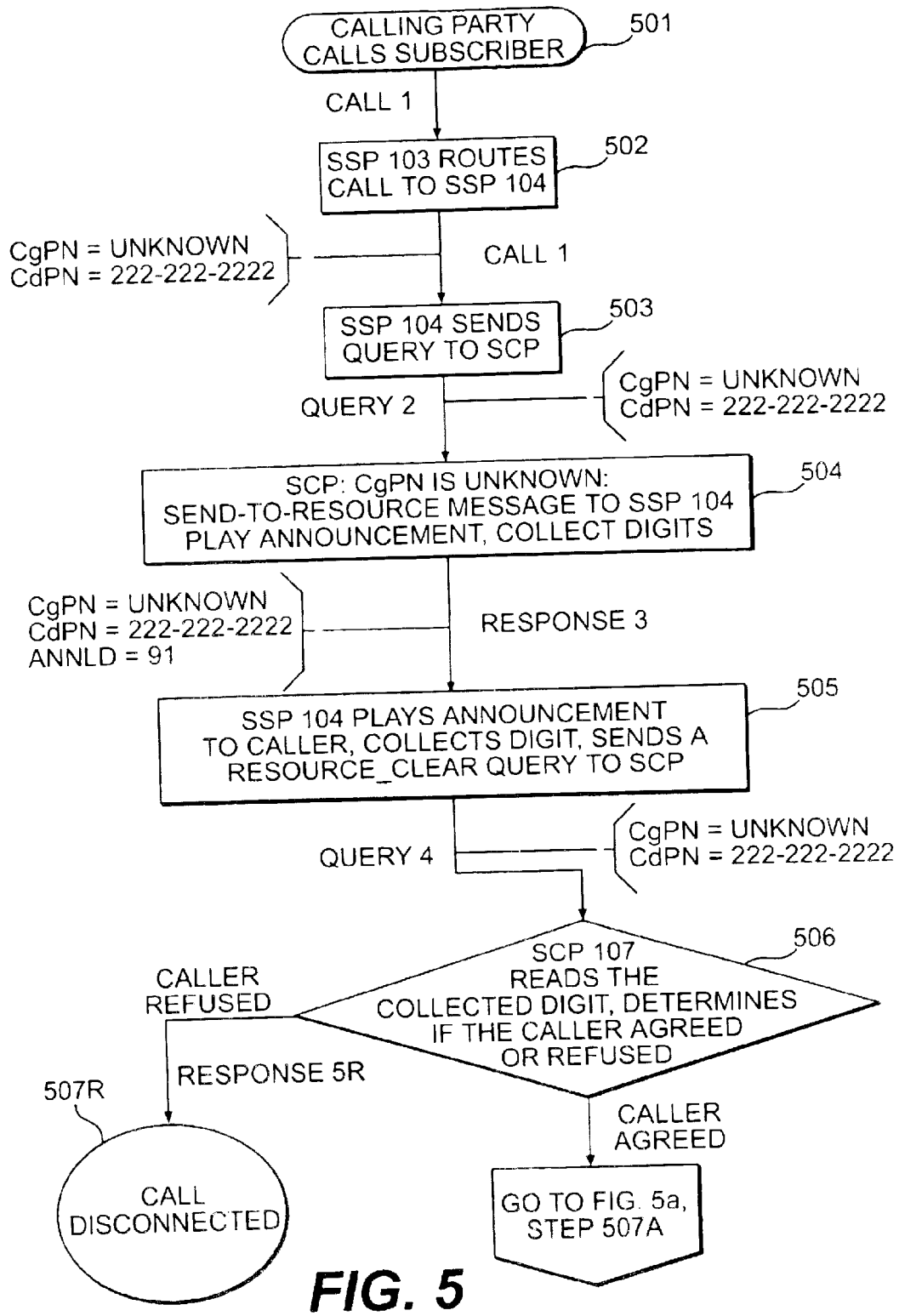

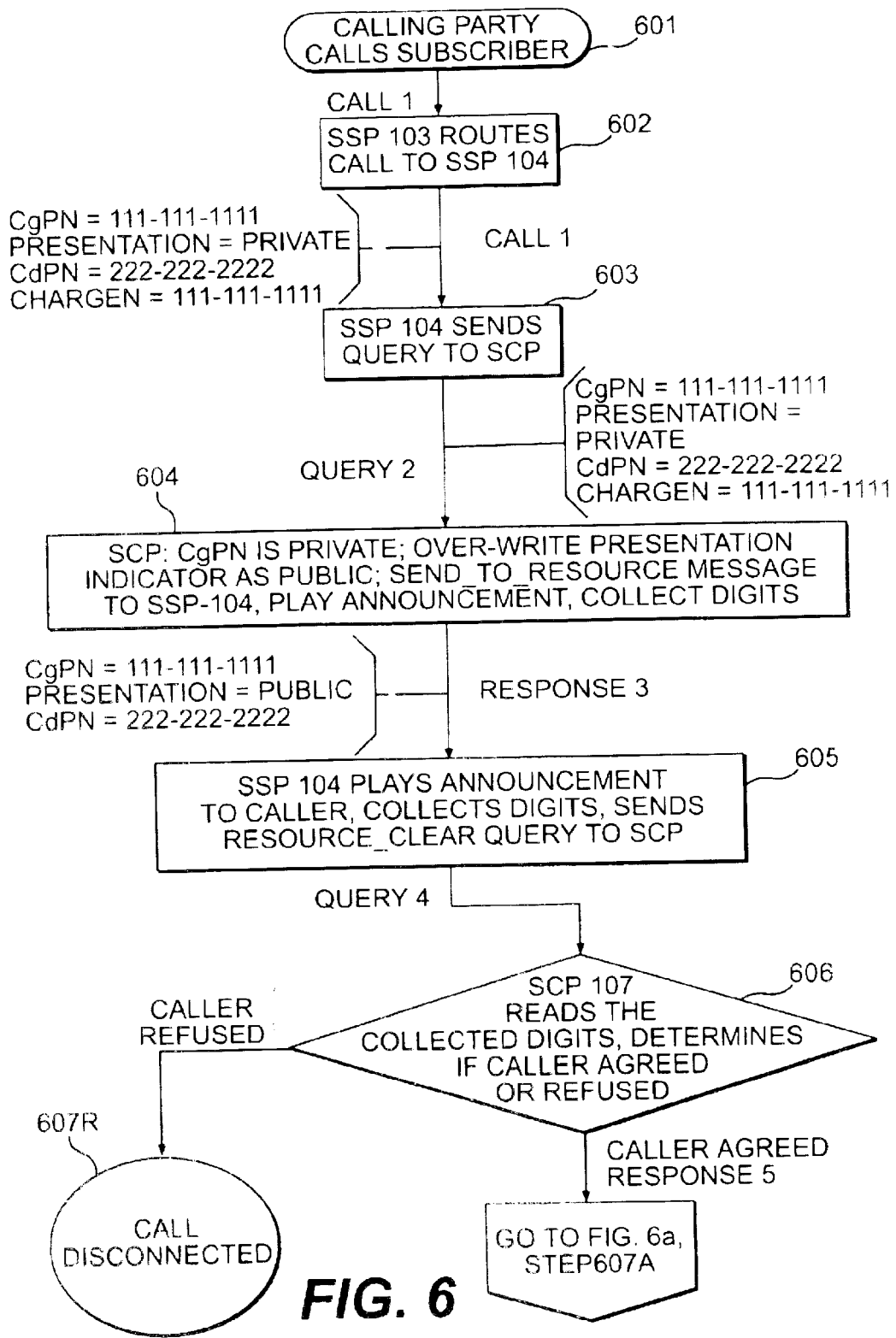

SYSTEM AND METHOD FOR COMPLETING PRIVATE OR UNKNOWN CALLS MADE TO A SUBSCRIBERS PRIVACY SCREENING SERVICE

This application is a continuation of Ser. No. 09/372,746 filed Aug. 10, 1999, now U.S. Pat. No. 6,553,109.

BACKGROUND

1. Field of the Invention

The present invention relates to the termination of telephone calls in a telephone network that provides privacy screening to its subscribers.

2. Background of the Invention

Private telephone numbers are telephone numbers that block services such as "caller ID" that would otherwise identify the caller to the party he or she is calling (the "called party"). A privacy screening service is a service that allows the subscriber to screen incoming calls. For example, a subscriber can choose to accept or reject an unknown call. In a telephone systems that offers private numbers and a privacy screening service to its subscribers, calls from a private number to a subscriber with the privacy screening service cannot be completed automatically, unless the caller grants permission to the system allowing the system to override the privacy of his or her number.

FIG. 1 is a schematic diagram showing the basic architecture of an Advanced Intelligent Network telephone system. The Advanced Intelligent Network System is described in U.S. Pat. Nos. 5,701,301 and 5,838,774, which are hereby incorporated by reference. FIG. 1 shows the caller's telephone 101 which is connected via voice line 102a to its Service Switching Point (SSP) 103. SSP 103 is connected via voice trunk 102b to a second SSP (SSP 104). SSP 104 is the SSP that services the called party's telephone 105. In this example, the called party is a subscriber who has subscribed to the privacy screening service. (The called party will be referred to as the "subscriber" as well as the "called party" herein.) FIG. 1 also shows a Signaling Transfer Point (STP) 106 which services a Service Control Point (SCP) 107 and a third SSP (SSP 108) 108 which services a Service Node (SN) 109. SCP 107 has a database 107a which contains subscriber information.

STP 106 is a signaling hub that routes packets of data over the common channel signaling network. Signaling System 7 (SS7) is the protocol that runs over the common channel signaling network. The common channel signaling network using the Signaling System 7 protocol is commonly referred to as the SS7 network. The SS7 network carries data and control messages to the SSPs in the telephone network. SCPs are powerful fault-tolerant computers, e.g., AT&T Star Server FT Model 3200 or AT&T Star Server FT Model 3300 computers (these computers and more recent models such as the Advantage P200 and the Advantage 4P200 are available from Lucent Technologies). SCPs are "intelligence centers" with access to applications packages, software, routines and databases that enable the network to deliver advanced services such as caller ID, privacy screening and call forwarding. SNs are physically generally similar to SCPs, but include voice and Dual Tone Multi-Frequency (DTMF) signal recognition circuits and voice synthesizers. The operators of the telephone network can write software routines so that their SNs can manage data, perform digit collection, respond to calls, route calls as specified by the telephone network, and perform voice recognition functions. The SN's voice circuits can be programmed to provide a voice response (e.g., to play pre-selected announcements) to callers. The SN can also be programmed to respond to input from the callers by, e.g., further routing the call.

As shown in FIG. 1, STP 106 controls communications between SSPs 103, 104 and 108 and SCP 107 over the SS7 data links. The SSPs are connected to the caller's and the subscriber's telephones and to each other via voice lines 102a and 102c and via voice trunks 102b and 102d. The SSPs can also communicate with each other over the SS7 data links shown in FIG. 1. The SSPs are also connected to and communicate with STP 106 and SCP 107 via SS7 data links 110a, 110b, 110c and 110d. SN 109 is connected to SSP 108 by an Integrated Service Digital Network (ISDN) Basic Rate Interface (BRI) line 111. Although FIGS. 1–2c only show one SCP and one STP, SCP 107 and STP 106 in FIGS. 1–2c generally represent two redundant SCPs and STPs, respectively, because it is preferable to have redundant SCPs and STPs in an AIN system.

FIG. 1a illustrates a prior art system for routing calls to subscribers to a privacy screening service. When a caller places a call to the subscriber, the call is routed by SSP 103 to SSP 104. FIG. 1a shows call 1 routed from the caller to SSP 103 and then to SSP 104. Because the subscriber has subscribed to the privacy screening service, that call (like all calls to that subscriber's number) triggers a "termination attempt trigger" or TAT. In response to the TAT, SSP 104 issues query 2, shown in FIG. 1a. Query 2 is a message that goes up to SCP 107 asking for directions as to how the call should be terminated. The query includes the following information: the subscriber's telephone number (in the called party field), the caller's telephone number (in the calling party field), the trigger criteria type (indicating the service for which the query is intended) and a presentation indicator in the calling party ID field.

SCP 107 checks the calling party's presentation indicator in the calling party ID field, and determines whether that caller has a public number (i.e., it is not a private number) or a private number, or whether the caller is unknown. If the caller's number is known and public, SCP 107 sends back a response (response 3 in FIG. 1a) instructing SSP 104 to terminate the call, and to supply the caller's telephone number (and if the subscriber has subscribed to a higher level of service, the caller's name and telephone number). In that case, SSP 104 terminates the call (call 1' in FIG. 1a), i.e., completes the call, supplying the subscriber with the caller's number (and possibly also with the caller's name if the subscriber has subscribed to, e.g. caller ID deluxe which provides the caller's name as well as the caller's telephone number).

However, if the caller's number is private, SCP 107 cannot authorize termination of the call without permission from the caller. In that case, the SCP's response (response 3 in FIG. 1a) directs the call from SSP 104 to SN 109 via SSP 108 (call 4 in FIG. 1a). Under the standard AIN protocol BRI Q.931, the call carries with it three numbers: (1) the number of the original called party (in this case the subscriber); (2) the number of the re-directing party (also the subscriber in this case); and (3) the number of the calling party. SN 109 then engages in a dialog with the caller. SN 109 asks the caller for permission to override his/her privacy. The caller is asked whether he or she agrees to have his or her privacy overriden. If the caller answers yes (e.g., by pressing 1 on his or her telephone), SN 109 dials a Customized Dialing Plan (CDP) code followed by the calling party number and the called party number (call 7 in FIG. 1a). The CDP code triggers an Info_Analyzed query to SCP 107 (query 5 in FIG. 1a). SCP 107 then retrieves the calling party number and the called party number from the query, and responds by sending an Analyze_Route message (response 6 in FIG. 1a) to SSP 108, with the subscriber's number as the called party number. SSP 108 makes an outbound call (call 7' in FIG. 1a) to the subscriber's SSP 104. The number of the actual calling party is substituted in the calling party field.

This call triggers a second TAT query at SSP 104 to SCP 107 (query 8), asking for authorization to terminate the call to the subscriber. SCP 107 recognizes this call as originating from an SN, and accordingly responds (response 9) authorizing termination of the call to the subscriber (call 1' in FIG. 1a), and release of the calling party's number, so that the subscriber can accept or reject the call.

However, the subscriber's line is also sometimes marked private. In that case, the SN does not have the subscriber's telephone number, because BRI lines do not have access to the re-directing party number when a call is being forwarded from a private number (this is generally true for all systems using the AIN Release 0.0 architecture). Thus SN 109 cannot place call 7 back to the subscriber, because SN 109 no longer knows the subscriber's telephone number.

Thus this system cannot terminate calls when both the calling party and the subscriber have private numbers, because the subscriber's telephone number is no longer available when the SN tries to re-route the call to the subscriber.

SUMMARY OF THE INVENTION

The present invention is a system and method that allows calls to be completed to subscribers who have subscribed to a privacy screening service, even when the subscriber and the caller have private numbers, or when the subscriber number is private and the caller number is unknown. The present invention is illustrated in FIGS. 2a (for calls from a public number), 2b (for calls from an unknown number), and 2c (for calls from a private number), implemented in an AIN network similar to the AIN networks illustrated in FIGS. 1 to 1a. FIGS. 2a–2c show arrows indicating messages—queries and responses—from SSP 104 and SSP 108 to and from STP 106. These messages are all routed to and from SCP 107 as well (just like query 2 and response 3 in FIG. 1a), but, for simplicity, the continuations of the messages from STP 106 to SCP 107 are not shown in FIGS. 2a–2c.

As shown in FIGS. 2a–2c, in all cases the calling party's call is routed (as call 1 in FIGS. 2a–2c) through the caller's SSP 103 to the subscriber's SSP 104. The call hits the subscriber's TAT, triggering a query (query 2 in FIGS. 2a–2c) which goes up to SCP 107 via STP 106. SCP 107 checks the calling party's presentation indicator in the calling party ID field and determines whether the calling party's number is public (i.e., nonprivate), private or unknown. If the calling number is public (the call flows for calls from a public calling number are shown schematically in FIG. 2a), SCP 107 sends back a response (response 3 in FIG. 2a) authorizing termination of the call to the subscriber. SSP 104 then terminates the call (call 1' in FIG. 2a).

If the calling party is unknown (the call flows from an unknown calling party are shown schematically in FIG. 2b), response 3 in FIG. 2b (in a preferred embodiment) instructs SSP 104 to ask the caller whether he or she is willing to record his or her name, so that it could be played to the subscriber. For example, the caller is asked to press a "1" for "yes" or a "2" for "no." SSP 104 collects the digit pressed by the calling party, and sends a Resource_Clear query (query 4) to SCP 107. SCP 107 reads the collected digit, and determines if the caller was willing to record his or her voice. If the calling party was not willing, the response (response 5 in FIG. 2b) instructs SSP 104 to disconnect the call. If the calling party was willing to have his or her name recorded, response 5 instructs SSP 104 to route the call to SN 109 via SSP 108 (call 1" in FIG. 2b).

There is a termination attempt trigger provisioned on SN 109's number at SSP 108. When the call hits that trigger, SSP 108 sends a query (query 6) to SCP 107, with the subscriber's number in the re-directing party field. SCP 107 retrieves the subscriber's number from the re-directing party field, and writes the number in the DisplayText field of its response (response 7) to SSP 108. SN 109 then prompts the calling party to state his or her name, and records the calling party's name. After the calling party records his or her name, SN 109 dials a Customized Dialing Plan (CDP) code, followed by SN 109's number and the subscriber's number. The CDP code triggers an Info_Analyzed query (query 8 in FIG. 2b) from SSP 108 to SCP 107 with the SN's number and the subscriber's number in the collected digits field of the query. SCP 107 retrieves the SN's number and the subscriber's number from the collected digits field of the query, and returns an Analyze_Route response (response 9 in FIG. 2b) to SSP 108 with the SN's number in the calling party field, the subscriber's number in the called party field and the SN's number in the charge number field. SSP 108 then routes the call to the subscriber via SSP 104 (calls 1''' and 1' in FIG. 2b). The call hits the termination attempt trigger provisioned on the subscriber's line at SSP 104, triggering a query (query 10) back to SCP 107. SCP 107 recognizes the SN's number in the charge number field, and authorizes termination of the call (response 11).

If the calling party number is private (the call flows for calls from private numbers are shown schematically in FIG. 2c), SCP 107 re-writes the presentation indicator in the calling party field as public, and in response 3 in FIG. 2c (in a preferred embodiment) instructs SSP 104 to ask the caller whether he or she is willing to have his or her privacy overriden. For example, the caller is asked to press a "1" for "yes" or a "2" for "no." SSP 104 collects the digit pressed by the calling party, and sends a Resource_Clear query (query 4) to SCP 107. SCP 107 reads the collected digit and determines if the caller was willing to have his or her privacy overriden. If the calling party was not willing, the response instructs SSP 104 to disconnect the call. If the calling party was willing to have his or her name recorded, the response (response 5 in FIG. 2c) instructs SSP 104 to route the call to SN 109 (call 6 in FIG. 2c).

At this point, before the call is terminated from SSP 108 to SN 109, SSP 108 still has access to the subscriber's telephone number (even if the subscriber's number is private) in the re-directing party identification field. However, the subscriber's number will be deleted from the re-directing party field when the call is terminated to SN 109.

The call to SN 109 at SSP 108 (call 6 in FIG. 2c) triggers the termination attempt trigger provisioned on SN 109's number (just as in the case for unknown callers). This trigger prompts a query (query 7 in FIG. 2c) back up to SCP 107. SCP 107 retrieves the subscriber's number from the re-directing party number field, and sends a response (response 8) to SSP 108 authorizing termination to SN 109, with the DisplayText field of the response populated with the subscriber's number. SSP 108 sends the subscriber number on to SN 109 in a setup message. SN 109 then retrieves the subscriber's number from the setup message and dials a Customized Dialing Plan (CDP) code, followed by a string consisting of the true calling party number and the subscriber's number. The CDP code triggers an Info_Analyzed query (query 9 in FIG. 2c) to SCP 107 with the calling party number and the subscriber's number in the collected digits field of the Info_Analyzed query. SCP 107 retrieves the calling party number and the subscriber's number from the collected digits field, and returns an Analyze_Route response (response 10 in FIG. 2c) with the SN as the charged party and the subscriber as the called party.

SSP 108 then routes the call to the subscriber's number at SSP 104. The call (call 6') hits the termination attempt trigger provisioned on the subscriber's line at SSP 104, triggering a query (query 11 in FIG. 2c) to SCP 107. SCP 107 recognizes the SN's number in the charged party field, and authorizes termination to the subscriber (response 12 in FIG. 2c). The call is then terminated to the subscriber (call 1' in FIG. 2c) and the subscriber is provided with the calling party's telephone number (and name, if the subscriber has a service, such as caller ID deluxe, that provides the subscriber with the name as well as the telephone number of the calling party).

The DisplayText field used to store the subscriber's number in the present invention is a field in the termination attempt query from SCP 107 to SSP 104. Ordinarily, the DisplayText field is used for providing, for example, calling party information on calls made to ISDN devices. The ten digits of the re-directing party/subscriber's telephone number fits within the constraints of the DisplayText field (generally, up to 40 characters may be displayed on the telephone's display).

Thus all calls from the SN to the subscriber will trigger two queries up to the SCP: first at SSP 108 and then at SSP 104. For calls from unknown calling parties, the SN remains on the call, even when the connection is made to the subscriber, because the SN has to play the recording of the calling party's name for the subscriber. For calls from calling parties with private numbers, the SN drops out as soon as the subscriber's telephone rings, because the SN no longer needs to be on the call.

Accordingly, it is an object of the present invention to provide a privacy screening service which allows calls to be routed to a subscriber to the service irrespective of whether the calling party number is public, unknown or private.

DETAILED DESCRIPTION OF THE INVENTION

Figure 3:
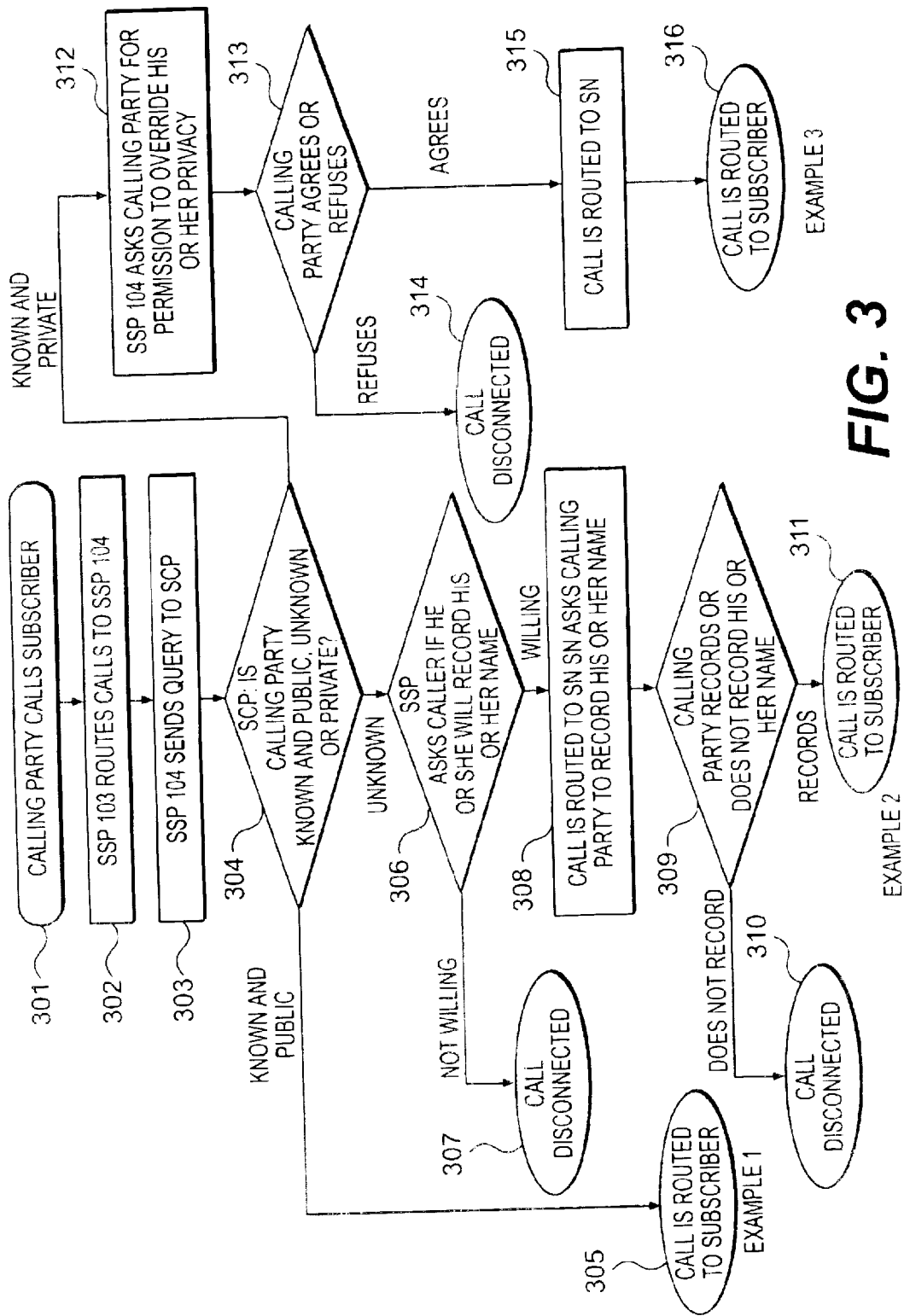
FIG. 3 is an overall schematic diagram of the call flows of the present invention.

The present invention can be further described by describing the sequence of call flows over the advanced intelligent network when a calling party dials a call to a subscriber who has subscribed to a privacy screening service. FIG. 3 is an overall schematic, showing that the call flows depend on whether the calling party number is known and public (further described in Example 1 and FIG. 4), whether the calling party number is unknown (Example 2 and FIGS. 5–5b), or whether the calling party number is private (Example 3 and FIGS. 6–6b).

In step 301 of FIG. 3, the calling party calls the subscriber. The calling party's SSP 103 routes the call to the subscriber's SSP 104 in step 302. That call triggers a query from SSP 104 to SCP 107 in step 303. In step 304, SCP 107 determines if the calling party number is known and public, unknown, or known and private. If the calling party's number is known and public, in step 305 the call is routed to the subscriber, as described in more detail in Example 1 and FIG. 4. If the calling party's number is unknown, in a preferred embodiment described in more detail in Example 2 below, SSP 104 asks the calling party if he or she is willing to record his or her name. If the calling party is not willing, the call is disconnected in step 307. If the calling party is willing, the call is routed to SN 109 in step 308, and SN 109 asks the calling party to record his or her name. In step 309, the calling party records his or her name, or changes his or her mind and does not do so. If the calling party does not record his or her name, the call is disconnected in step 310. In an alternate embodiment, not shown in FIG. 3, steps 306–309 are replaced by routing the call to SN 109, which then asks the calling party to record his or her name. If the calling party records his or her name, the call is routed to the subscriber in step 311, as described in more detail in Example 2 and FIGS. 5–5b.

If the calling party's number is known and private, SSP 104 asks the calling party for permission to override his or her privacy in step 312, and the calling party agrees or refuses in step 313. If the calling party refuses to have his or her privacy overriden, the call is disconnected in step 314. If the calling party grants permission, the call is routed to the service node in step 315 and then on to the subscriber, as described in Example 3 and FIGS. 6–6b.

FIGS. 4–6b represent schematically the call flows corresponding to Examples 1–4, respectively. The acronyms used in FIGS. 4–6b are:

| | |
|---|---|
| Calling Party Number: | CgPN |
| Called Party Number: | CdPN |
| Charge Number: | ChargeN |
| Re-Directing Party Number: | ReDirectPN |
| DisplayText: | DspTxt |
| Announcement Identification: | AnnID |

The announcements played by the network will be exemplified as follows:

90: Announcement to an unknown calling party, asking the calling party to indicate a willingness to record his/her name by, e.g., pressing a 1, or a refusal by, e.g., pressing a 2.

91: Announcement to an unknown calling party, asking the calling party to record his/her name.

92: Announcement to the subscriber, playing the calling party's name, and asking the subscriber to accept or reject the call.

93: Announcement to the calling party when the calling party's number is private, asking the calling party for permission to provide his/her number (and name) to the subscriber.

For the purpose of illustrating the invention with specific examples, the flow charts in FIGS. 4–6b will all have the calling party number (CgPN) as 111-111-1111, the subscriber's number (initially, CdPN) as 222-222-2222, and the Service Node's Multi-Line Hunt Group number as 333-333-3333.

As described above with reference to FIG. 3, the specific sequence of calls depends on the private/public/unknown status of the calling party. There are three categories of possible call flows, examples of which are described in Examples 1–3, respectively.

EXAMPLE 1

Calling Party is Known and Public

Figure 4:
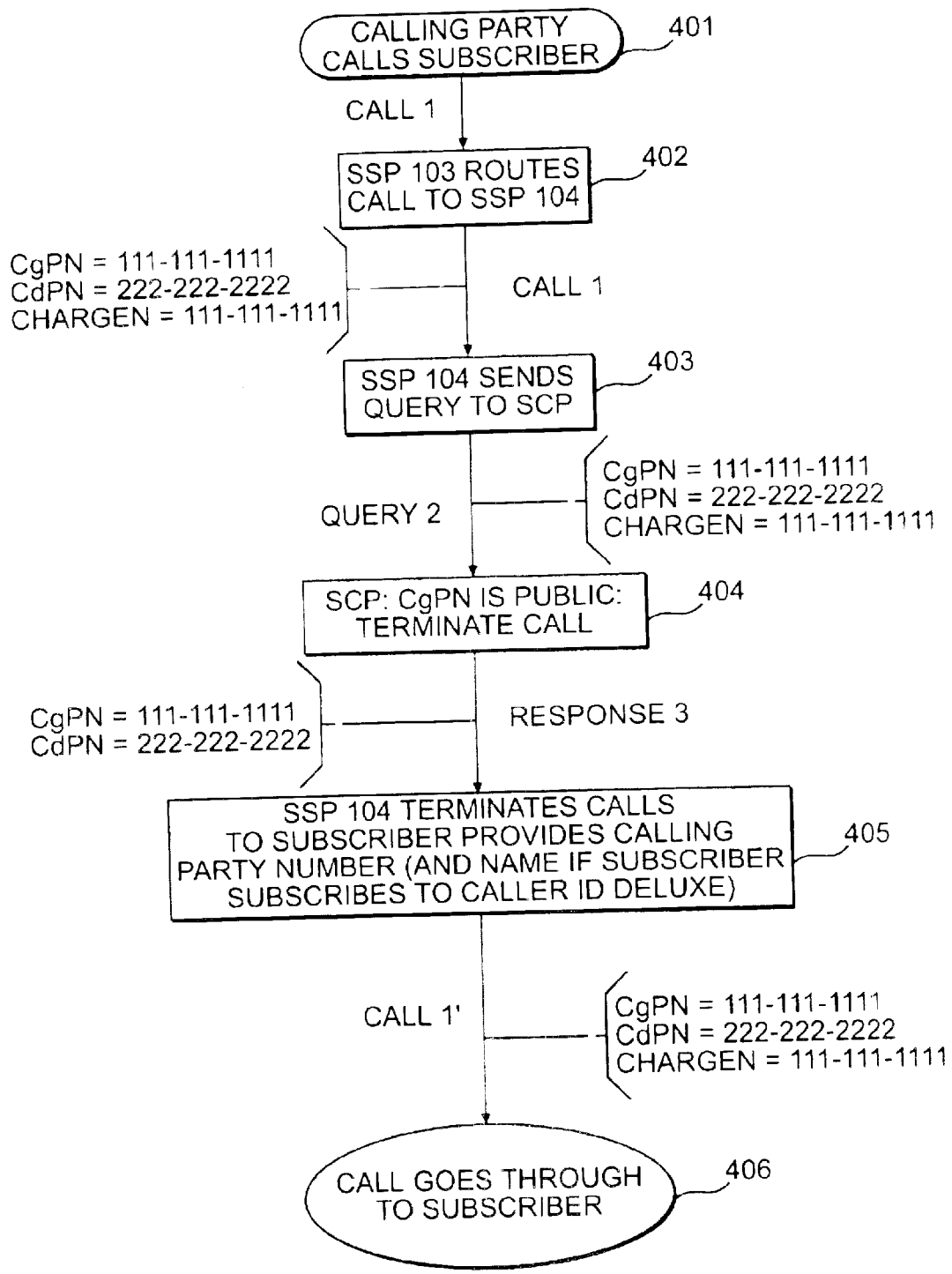
FIG. 4 is a chart outlining the call flows of the present invention, when the subscriber has subscribed to a privacy screening service, and the calling party's number is known and public.
Figure 5A:
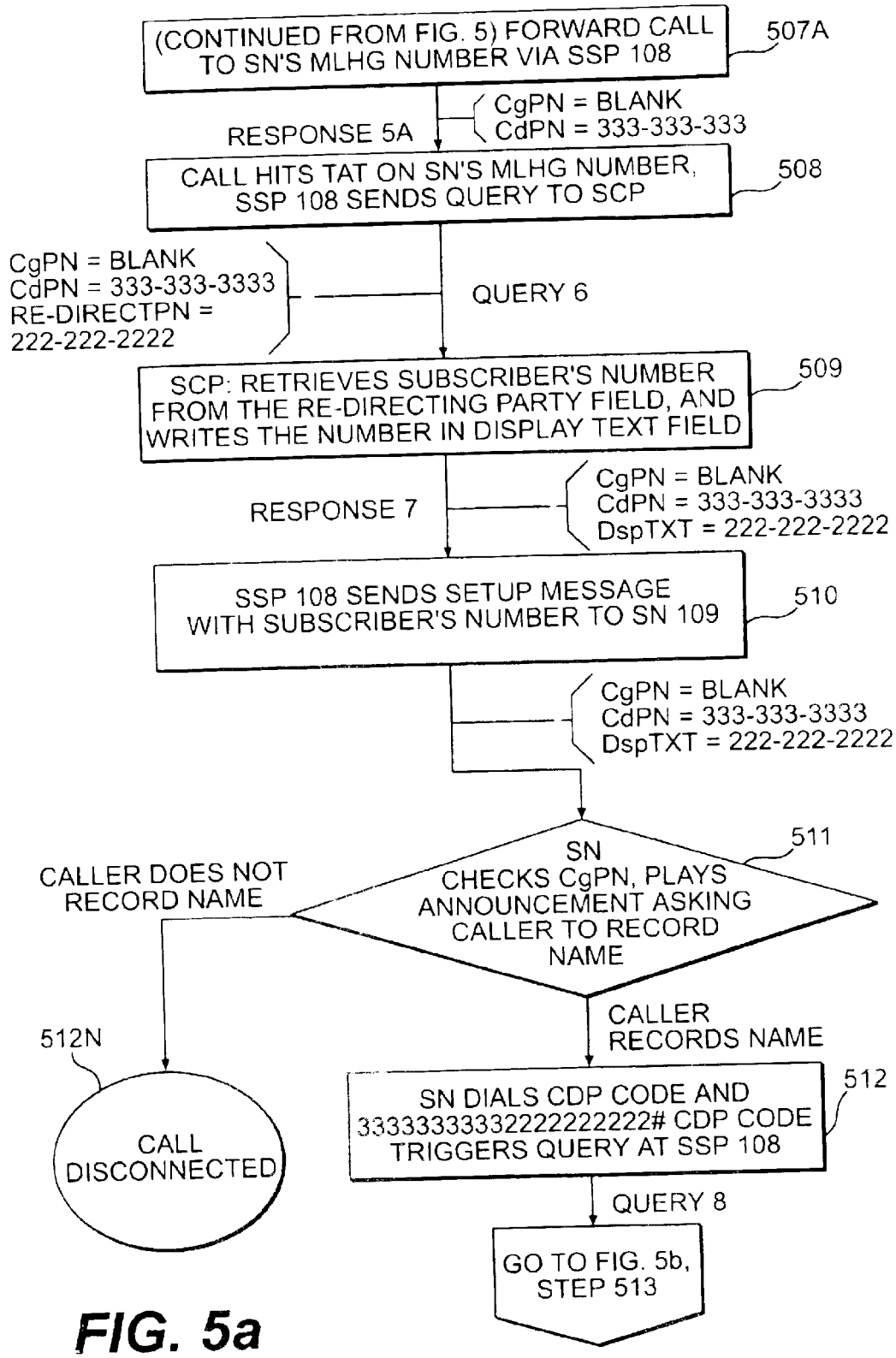
FIGS. 5–5b are charts outlining the call flows of the present invention, when the subscriber has subscribed to a privacy screening service, and the calling party's number is unknown.

The call flows when the calling party number is known and public are shown in FIG. 4. The call flows start in step 401 with the calling party dialing the subscriber's telephone number. In step 402, the call is routed through SSP 103 (the caller's SSP) to SSP 104 (the subscriber's SSP). Because the subscriber has a Termination Attempt Trigger provisioned on SSP 104, in step 403 the TAT triggers and SSP 104 sends a query (query 2) to SCP 107 with the following information: the calling party number in the CgPN field; the called party number, i.e., the subscriber's number, in the CdPN field; and the calling party number in the Charge Number field.

In step 404, SCP 107 checks the presentation indicator in the calling party ID field of the query from SSP 104, and determines that the calling party number is public. Since the calling party number is public, SCP 107 responds (response 3) by sending a message to SSP 104 with instructions to terminate the call, and to provide the calling party identification to the subscriber. If the subscriber has subscribed to caller ID deluxe, SSP 104 sends a TR-1188 query to SCP 107 to obtain the calling party's name (not shown in FIG. 4). In step 405, SSP 104 terminates the call to the subscriber, and provides the subscriber with the calling party's number (and name, if the subscriber has caller ID deluxe). In step 406, the call goes through.

EXAMPLE 2

Calling Party is Unknown

Figure 5B:
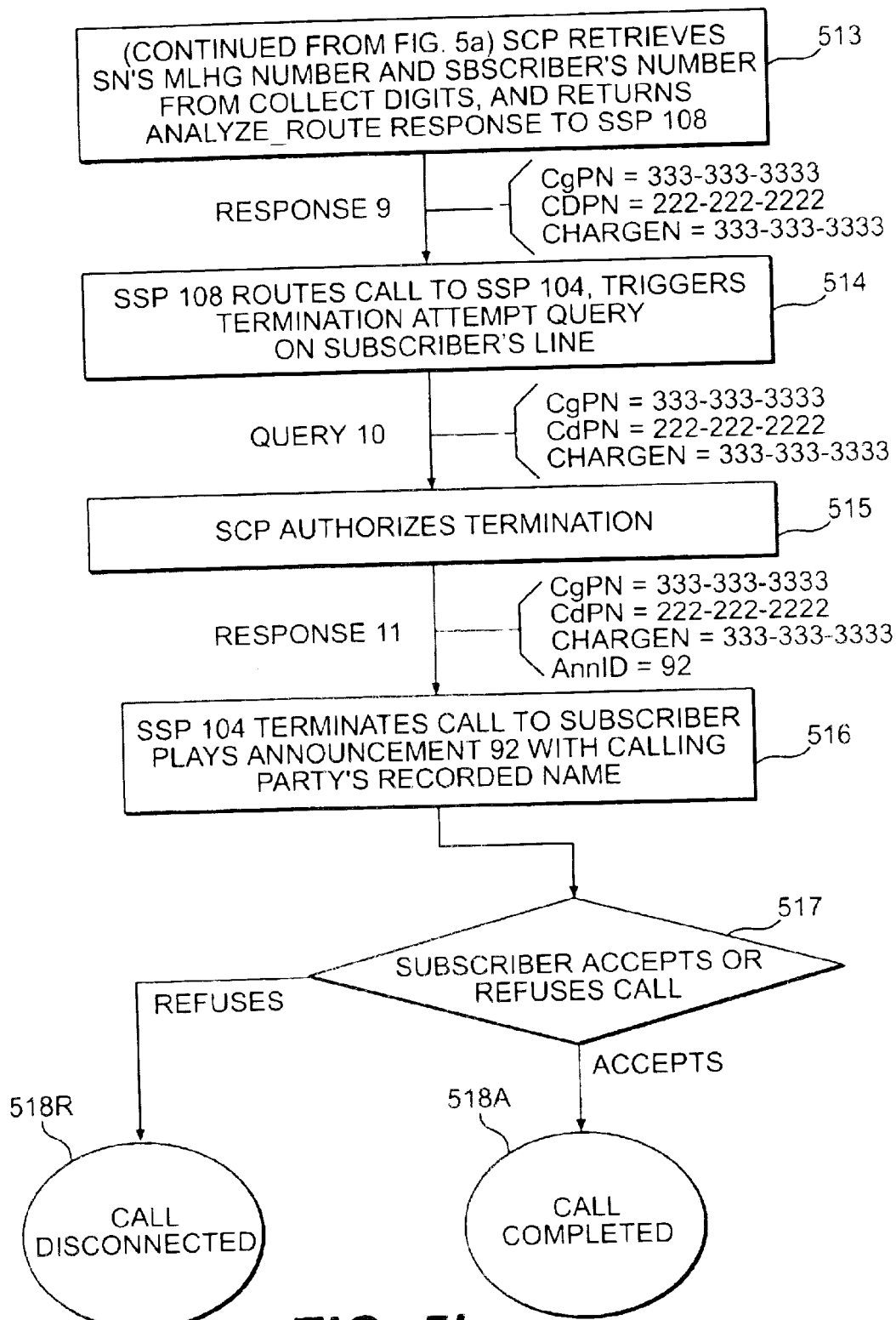

The call flow for an unknown calling party (e.g., because the call is from outside the telephone network) is shown in FIGS. 5–5b. Steps 501–503 are similar to steps 401–403 described above with respect to FIG. 3. In step 504, SCP 107 checks the calling party field, determines that the calling party is unknown, and sends a Send_to_Resource message to SSP 104 (response 3).

There are two alternatives for proceeding at this point. The first alternative saves network resources, by not forwarding the call to the SN unless the caller agrees ahead of time to record his or her name so that it may be played for the subscriber. This alternative is shown schematically in the flowcharts of FIGS. 5–5b (and is the preferred embodiment described in the Summary of the Invention section). In the second alternative the call is forwarded to the SN, at which time the caller can decide whether or not to record his or her name. This second alternative may be considered less burdensome on the caller, because he or she only has to respond to the system once.

In the first alternative, the Send_to_Resource message from SCP 107 contains the identification of an announcement (e.g., announcement 90) to be played to the calling party, instructions to SSP 104 to collect one or more digits from the calling party and the number of digits to be collected from the calling party (in this case, usually just one). In step 505, SSP 104 then plays the announcement to the caller, asking the caller if he or she would record his or her name, collects a digit from the caller indicating acceptance or refusal, and sends a Resource_Clear query to SCP 107 (query 4). The query has the caller's response, usually in the form of the single digit (e.g., a "1" to accept, a "2" to refuse). If the caller refused to record his or her name (e.g., the caller pressed a "2"), in step 506 SCP 107 responds to the query by instructing SSP 104 to disconnect the call, and the call is disconnected in step 507R. Optionally, SSP 104 plays an announcement explaining that the call is being disconnected because the caller refused to record his or her name. If the caller had agreed to record his or her name, in step 507A, shown in FIG. 5a, SCP 107 responds to this query with a Forward_Call message (response 5), with the SN's MLHG number in the called party field, the calling party field blank, and the subscriber's number in the Re-Directing Party ID field.

In step 508, the TAT on the SN's MLHG line at SSP 108 triggers a query from SSP 108 to SCP 107 (query 6, with the SN's MLHG number in the CdPN field, and the CgPN field blank). Since the CdPN is the SN's MLHG number, SCP 107 knows that this is a query triggered by SN 109's MLHG TAT at SSP 108. In step 509, SCP 107 therefore takes the subscriber's number from the Re-Directing Party ID field of the query, and writes the subscriber's number in the DisplayText field of the SCP's authorize termination response to the query. Thus SCP 107's response (response 7) has SN 109's MLHG number in the CdPN field and the subscriber number in the DisplayText field. There is a blank in the CgPN field of SCP 107's response.

In step 510, SSP 108 then sends a setup message to SN 109, with the subscriber's number SSP 108 had retrieved from the DisplayText field of the response in the setup message. In step 511, SN 109 then checks the CgPN, and determines that the call is from a party with an unknown calling party number. SN 109 then plays an announcement, e.g., announcement 91, to the caller, asking the caller to record his or her name. After the calling party's name is recorded, in step 512 SN 109 dials a CDP code followed by a string consisting of the 10-digit SN 109 MLHG number (which it retrieved from the CdPN field) followed by the subscriber's number (which it retrieved from the DisplayText field) and ending with the # sign. If the calling party does not record anything, the call is disconnected after a predetermined time (e.g., 3–5 seconds) in step 512N.

When CDP code and string reach SSP 108, the CDP code triggers a query (query 8) from SSP 108 to SCP 107 (as always, via STP 106). As shown in FIG. 5b, in step 513 SCP 107 retrieves SN 109's MLHG number and the subscriber's number from the collected digits field, and returns an Analyze_Route response (response 9) with CdPN=subscriber's number, CgPN=SN 109's MLHG number and ChargeN=SN's 109 MLHG number. In step 514, SSP 108 routes the call to the subscriber's SSP, SSP 104. Since there is a TAT on the subscriber's line at SSP 104, this triggers a query (query 10) from SSP 104 to SCP 107. In step 515, SCP 107 then authorizes termination in response 11, because it recognizes SN 109's MLHG number in the ChargeN field.

In step 516, SSP 104 terminates the call to the subscriber, and SN 19 plays an announcement, e.g., announcement 92, playing a recording (using the calling party's just-recorded name) and asking the subscriber to accept the call (e.g., by pressing "1") or to reject the call (e.g., by pressing "2" or hanging up). In step 517, the subscriber decides whether to accept the call (e.g., by pressing "1") or to reject the call (e.g., by pressing "2" or hanging up). If the subscriber agrees to accept the call, the call is completed (step 518A). If the subscriber refuses to accept the call, the call is disconnected (step 518R).

In the second alternative, response 3 from SCP 107 to SSP 104 instructs SSP 104 to forward the call to SN 109, via SSP 104. In this alternative, SN 109 asks the caller to record his or her name using, e.g., announcement 91, i.e., in step 504 SCP directs SSP 104 to forward the call to SN 109. Steps 505 to 510 are not used. In step 511, SN 109 asks the caller to record his or her name. If the caller refuses or hangs up, the call is terminated. If the caller responds to the announcement by recording his or her name, then the call flows proceed generally as described above.

EXAMPLE 3

Calling Party is Private

Figure 6A:
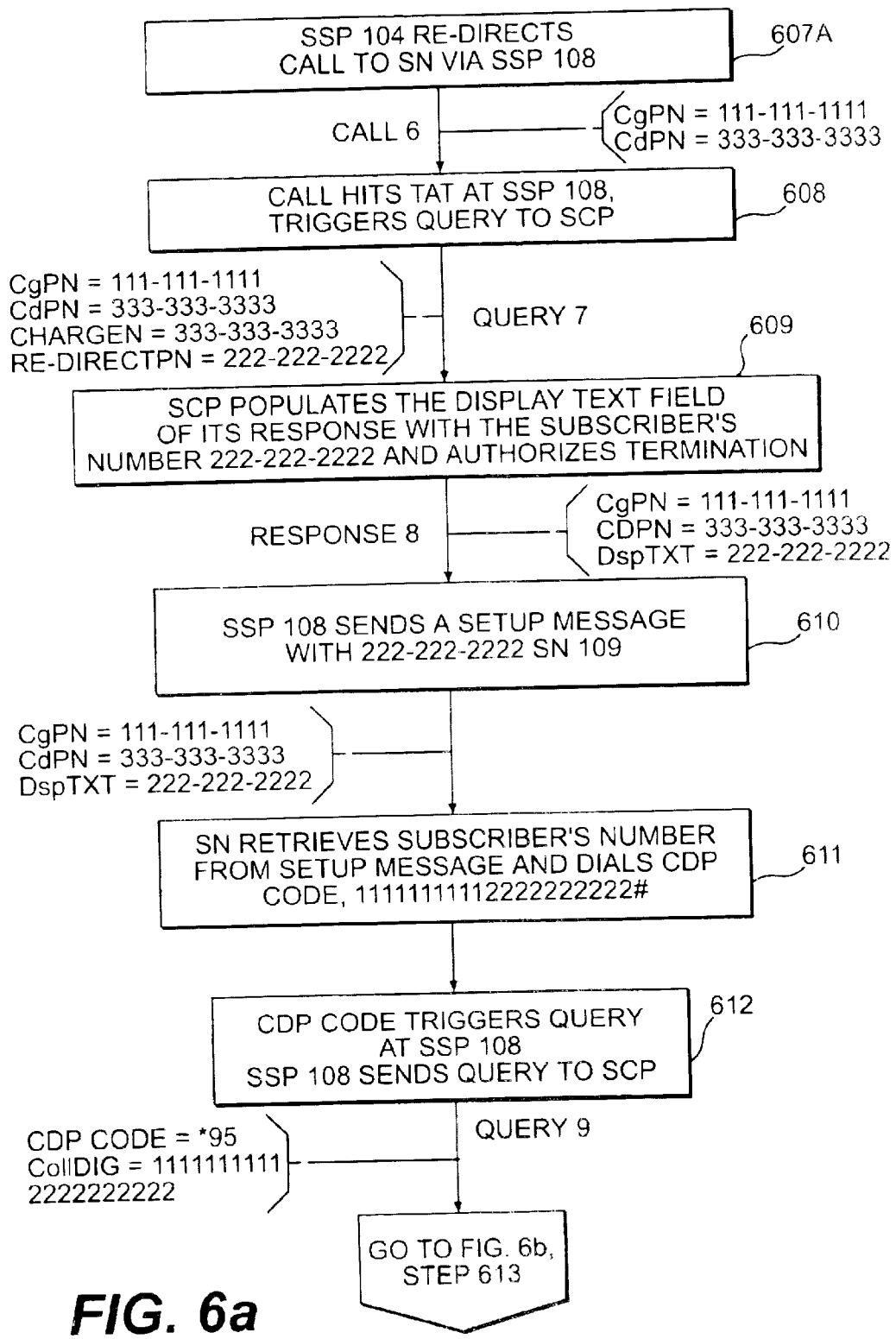
FIGS. 6–6b are charts outlining the call flows of the present invention when the subscriber has subscribed to a privacy screening service and the calling party's number is private.
Figure 6B:
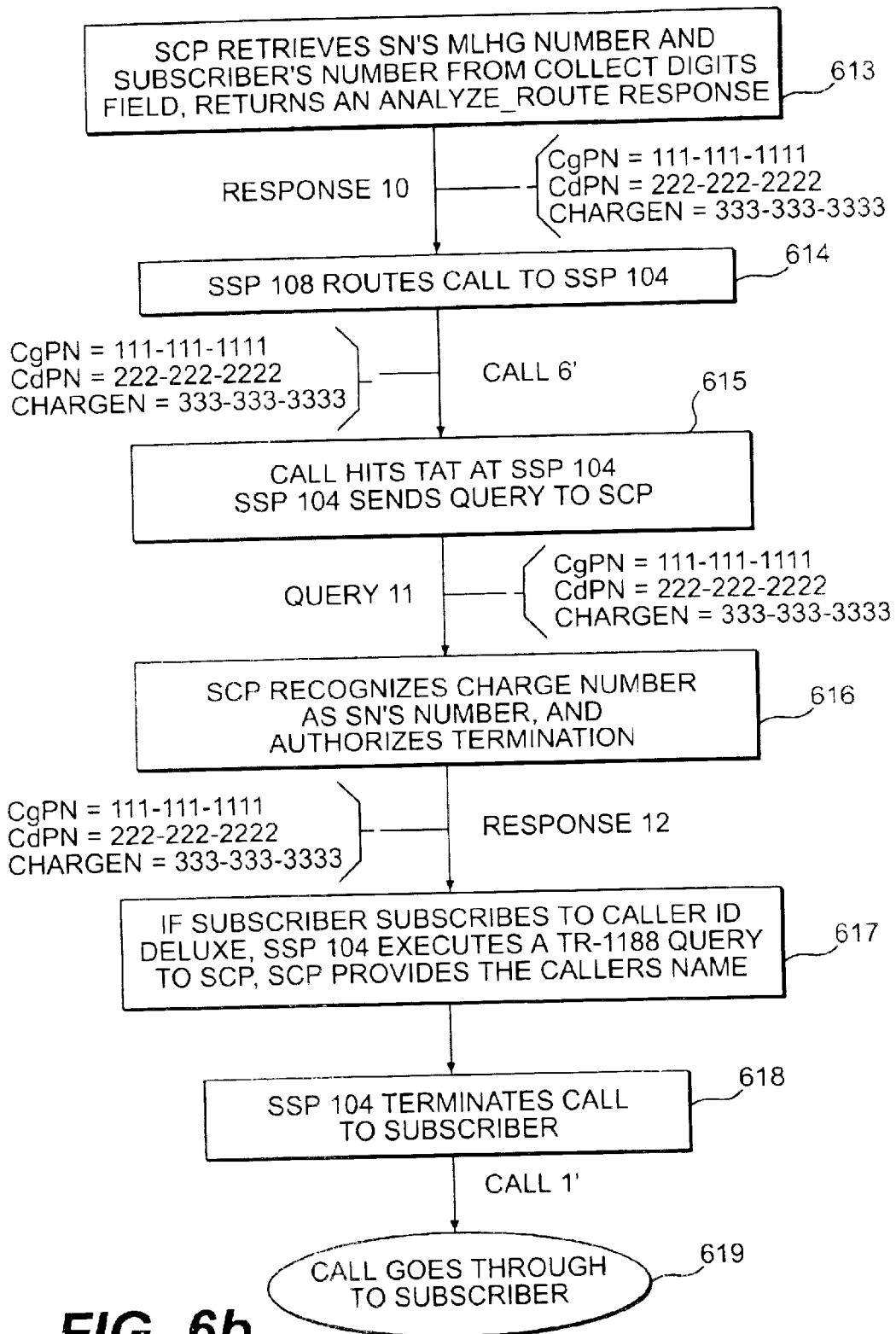

The call flows when the calling party number is private are shown in FIGS. 6–6b. These call flows do not depend on whether the subscriber's number is private or public. Steps 601–603 are similar to steps 401–403 described above with respect to FIG. 4. In step 604, SCP 107 checks the calling party presentation indicator in the calling party ID field and determines that the calling party number is private.

There are two alternatives for proceeding at this point. The first alternative saves network resources, by not forwarding the call to the SN unless the caller agrees ahead of time to have his or her privacy overridden. This alternative is shown schematically in the flowcharts of FIGS. 6–6b (and is the preferred embodiment described in the Summary of the Invention section). In the second alternative the call is forwarded to the SN, at which time the caller can decide whether or not to allow his or her privacy to be overridden. This second alternative may be considered less burdensome on the caller, because he or she only has to respond to the system once.

In the first alternative, in step 604 SCP 107 overwrites the presentation indicator as public, and then sends a Send_to_Resource message (response 3) to SSP 104, containing the identification of an announcement (e.g., announcement 93, asking the calling party for permission to override his or her privacy) to be played to the calling party, instructions to SSP 104 to collect digits from the calling party indicating agreement or refusal, and the number of digits to be collected from the calling party (in this case, usually just one digit). In step 605, SSP 104 then plays the announcement to the caller, asking the caller if he or she would allow his or her privacy to be overridden, collects a digit from the caller indicating allowance or refusal, and sends a Resource_Clear query to SCP 107 (query 4). The query has the caller's response, usually in the form of the single digit (e.g., a "1" to accept, a "2" to refuse). In step 606, SCP 107 reads the collected digit(s), and determines whether the caller agreed or refused to have his or her privacy overriden. If the caller refused to allow his or her privacy to be overriden (e.g., the caller pressed a "2"), SCP 107 responds to the query by instructing SSP 104 to disconnect the call, and the call is disconnected in step 607R. Optionally, SSP 104 plays an announcement explaining that the call is being disconnected because the caller refused to allow his or her privacy to be overriden. If the caller had agreed to record his or her name, SCP 107 responds to this query with a Forward_Call message (response 5), with the SN's MLHG number in the called party field and the subscriber's number in the Re-Directing Party ID field.

Figure 1:
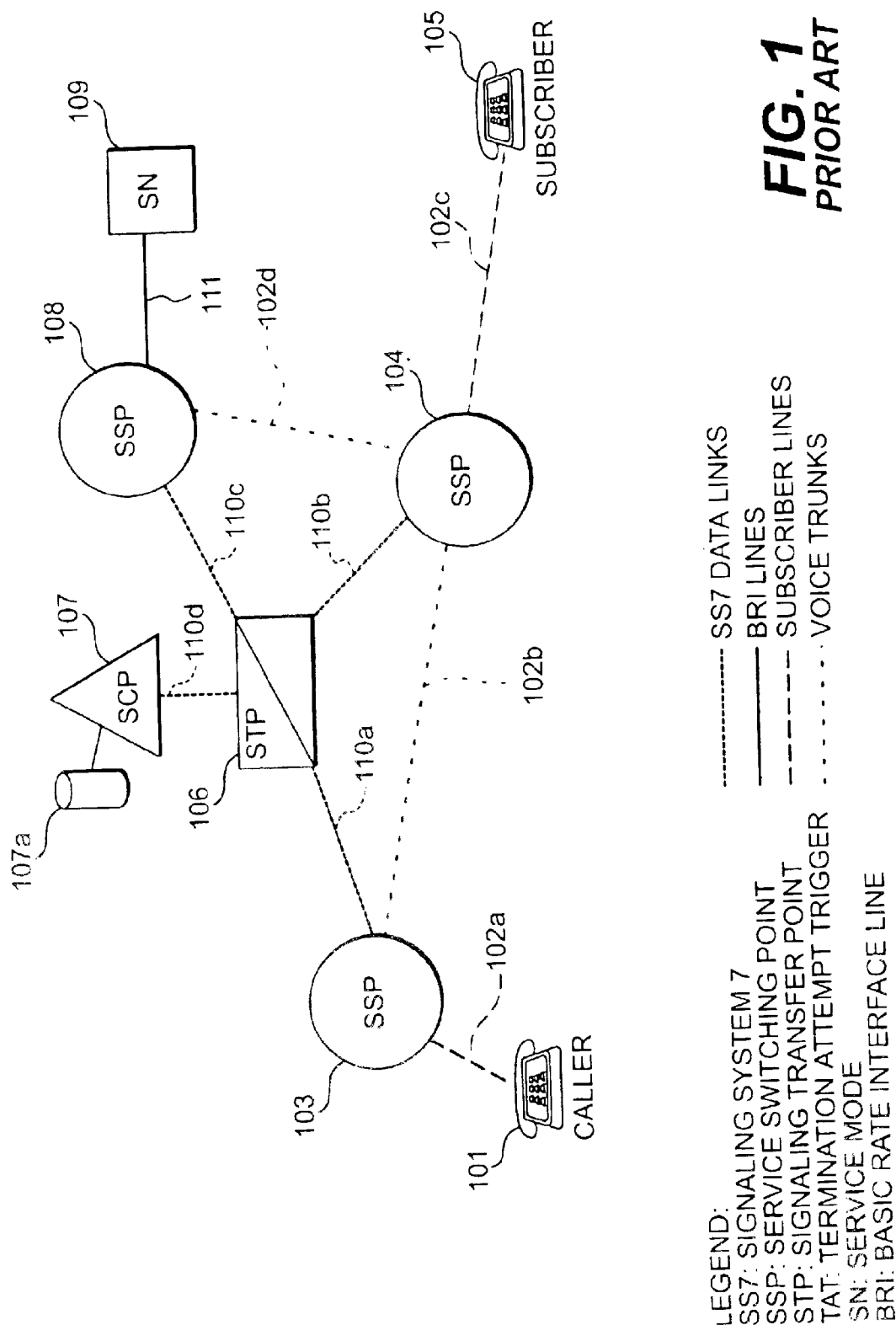
FIG. 1 is a schematic diagram showing the basic architecture of an AIN telephone network.
Figure 1A:
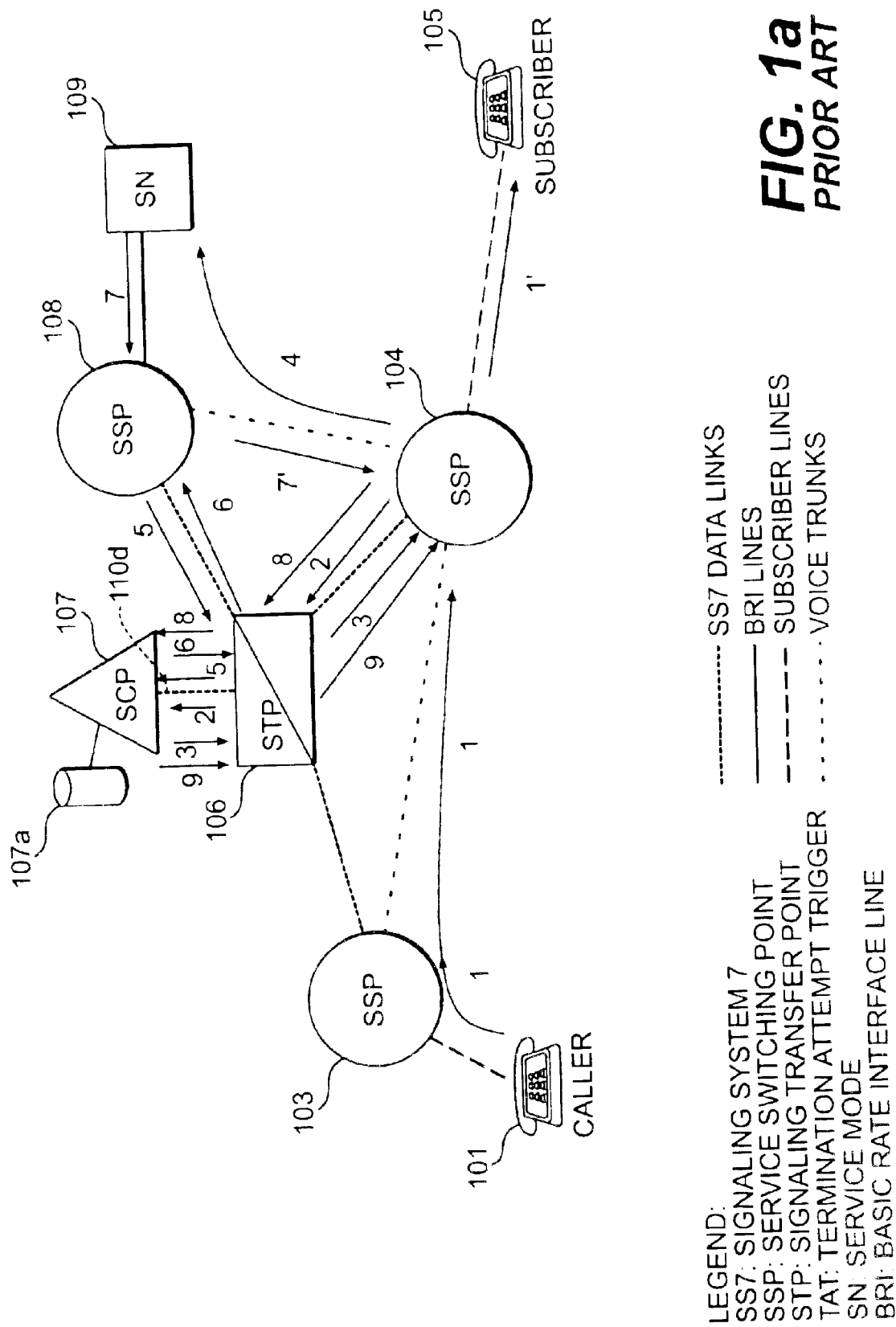
FIG. 1a is a schematic diagram showing the routing of calls when a subscriber has subscribed to a privacy screening service and the calling party's number is private.
Figure 2A:
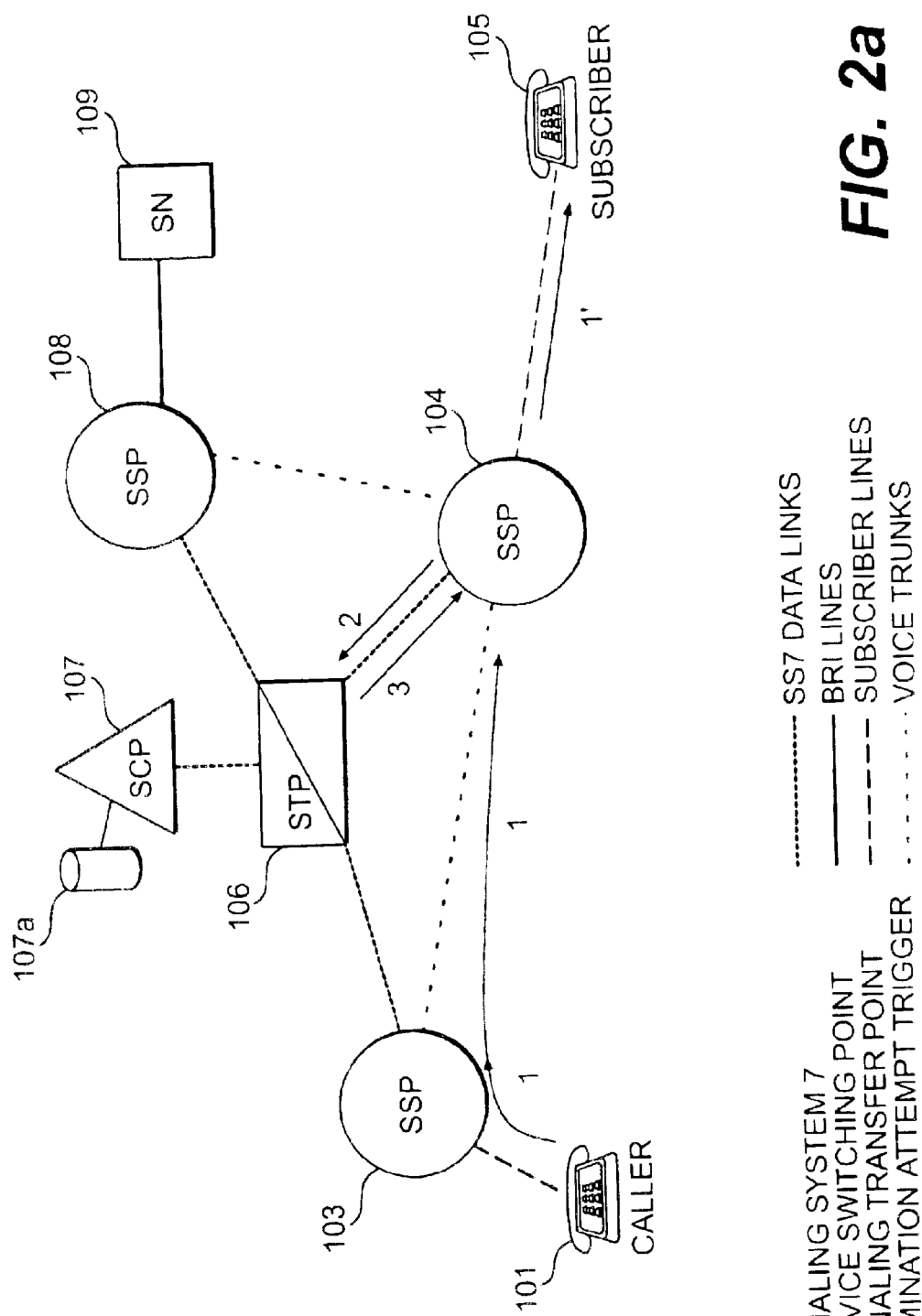
FIG. 2a is a schematic diagram showing the routing of calls for the present invention, when a subscriber has subscribed to a privacy screening service and the calling party's number is public.
Figure 2B:
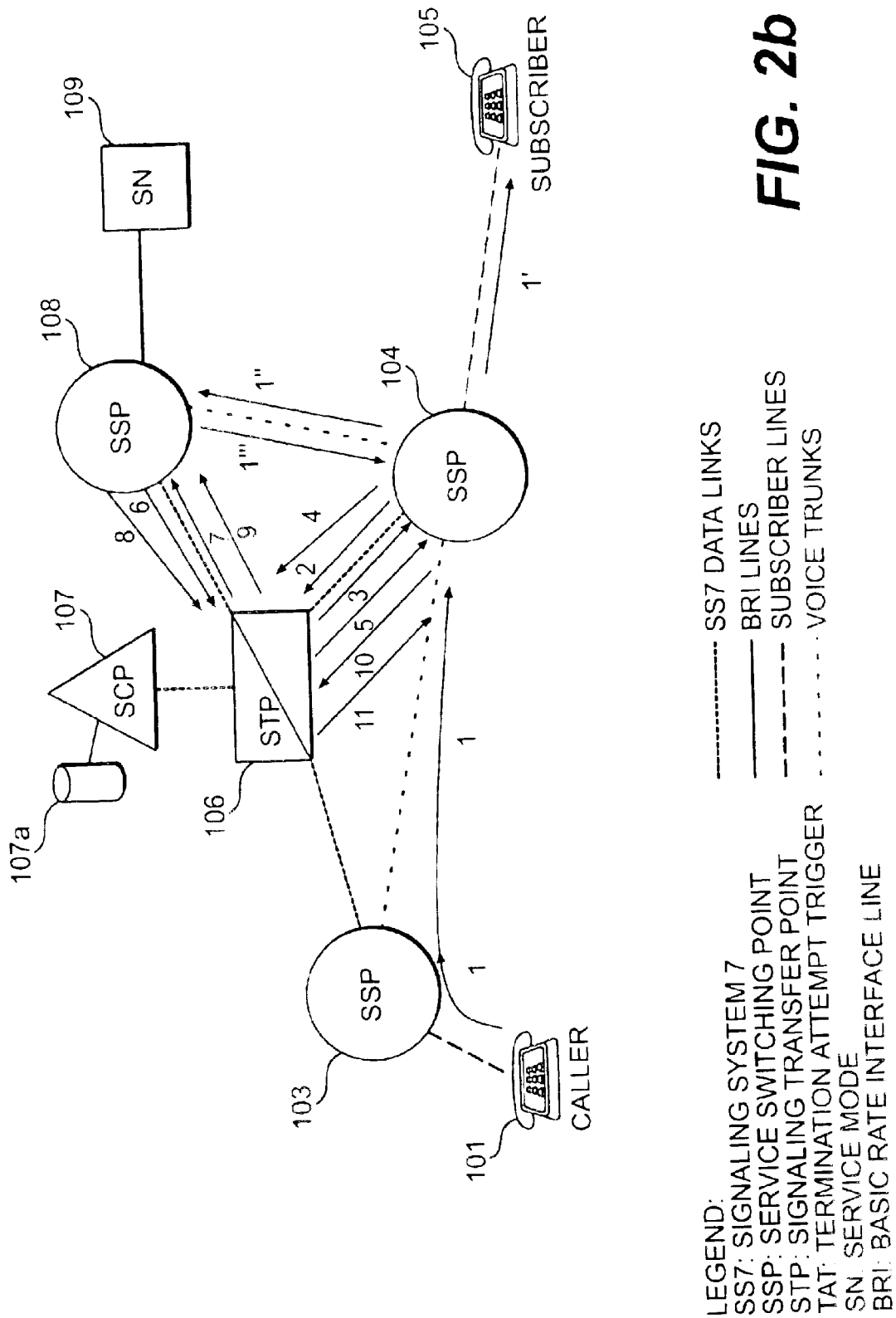
FIG. 2b is a schematic diagram showing the routing of calls for the present invention, when a subscriber has subscribed to a privacy screening service and the calling party's number is unknown.
Figure 2C:
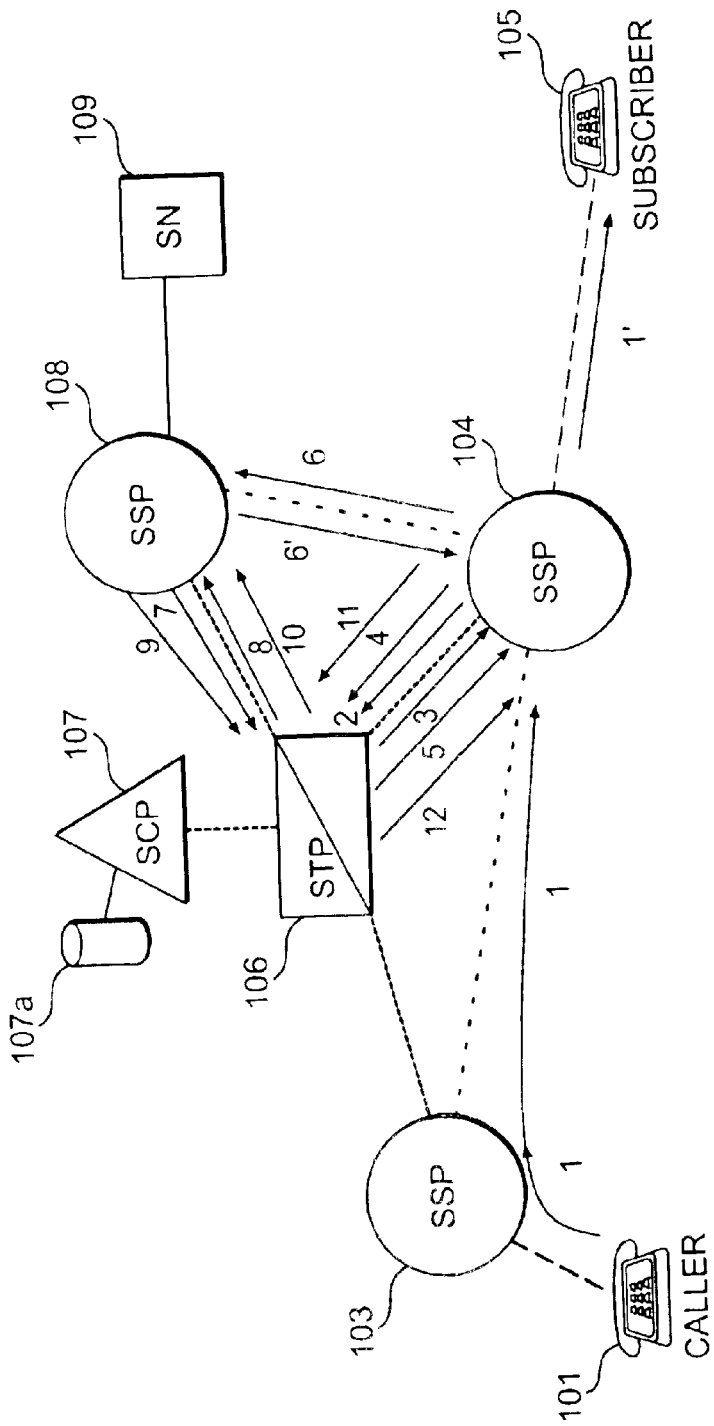
FIG. 2c is a schematic diagram showing the routing of calls for the present invention, when a subscriber has subscribed to a privacy screening service and the calling party's number is private.

In step 607A, shown in FIG. 6a, SSP 104 then forwards the call to SN 109's Multi-Line Hunt Group number, via SSP 108 (call 6 in FIG. 2c). Call 6 reaches SSP 108, with the subscriber's number in the re-directing party field. However, before the call is terminated to SN 109, the subscriber's number is deleted from the re-directing party field, because the AIN network automatically deletes the re-directing party number from the re-directing party field when the re-directing party has a private number before terminating a call.

To address this problem, a termination attempt trigger is assigned to the SN's Multi-Line Hunt Group Number at SSP 108. Thus, in step 608, when the call (call 6 in FIG. 2c) hits that TAT trigger, the call triggers a query back to SCP 107 along the SS7 network (query 7 in FIG. 2c). In step 609, SCP 107 populates the DisplayText field with the subscriber's telephone number, which it can obtain from the Redirecting Party field. The response from SCP 107 (response 8) to SSP 108 is an Authorize_Termination message, with the subscriber's number in the DisplayText field. In step 610, SSP 108 sends a setup message to SN 109, with the subscriber's telephone number in its DisplayText field, and with the calling party number in its CgPN field. In step 611, SN 109 retrieves the subscriber's telephone number from the DisplayText field of the setup message, and then dials a CDP code (e.g., ★95) followed by a string consisting of the calling party number (which it retrieved from the CgPN field) followed by the subscriber's number (which it retrieved from the DisplayText field) and ending with the # sign.

In step 612, when this string reaches SSP 108, the CDP code triggers a query (query 9) to SCP 107 (as always, via STP 106). In step 613, shown in FIG. 6b, SCP 107 retrieves the calling party number and the subscriber's number from the collected digits field, and responds to the query with an Analyze_Route response (response 10) with CdPN=subscriber's number and ChargeN=SN's 109 MLHG number, and CgPN=true calling party number.

In step 614, SSP 108 then routes the call to the subscriber's SSP, SSP 104 (call 6'). This call hits the subscriber's TAT at SSP 104. In step 615, SSP 104 sends a query (query 11) to SCP 107. In step 616, SCP 107 recognizes SN 109's number in the charge number field, and authorizes termination to the subscriber (response 12). In step 617, if the subscriber also subscribes to caller ID deluxe, SSP 104 sends a TR-1188 query to SCP 107. SCP 107 retrieves the caller's name from its database 107a, and responds with the caller's name in the DisplayText field. In step 618, SSP 104 terminates the call to the subscriber, providing the subscriber with the calling party's number (and name, if caller ID deluxe).

The call goes through in step 619 (call 1'). As soon as the subscriber's telephone rings, SN 109 drops out of the call.

In the second alternative, response 3 from SCP 107 to SSP 104 instructs SSP 104 to forward the call to SN 109, via SSP 104. In this alternative, SN 109 asks the caller for permission to override his or her privacy. Thus in step 604, SCP 107 directs SSP 104 to forward the call to SN 109. SN 109 asks the caller for permission to override his or her privacy. If the caller refuses or hangs up, the call is terminated. If the caller allows his or her privacy to be overriden the call flow proceeds to termination of the call to the subscriber, generally as described above.

Examples 1–3 have been written, for the purposes of illustration, with three separate SSPs (SSP 103, SSP 104 and SSP 108). However, in many cases, the same SSP may serve both the calling party and the subscriber (in which case SSP 103 and SSP 104 would be the same SSP), or the same SSP may serve the calling party and the SN (in which case SSP 103 and SSP 108 would be the same SSP), or the same SSP may serve the subscriber and the SN (in which case SSP 104 and SSP 108 would be the same SSP). Similarly, although the present invention is illustrated and described herein with only one SCP and one STP, in general more than one SCP and one STP may carry out the functions described herein for the SCP and STP shown in the Figures. Furthermore, more than one SN may be used to carry out the functions of SN 109.

The foregoing disclosure of embodiments of the present invention has been presented for purposes of illustration and description It is not exhaustive or intended to limit the invention to the precise forms disclosed herein. Many variations and modifications of the embodiments described herein will be obvious to one of ordinary skill in the art in light of the above disclosure. The scope of the invention is to be defined only by the claims appended hereto, and by their equivalents.

What we claim is:

1. A method for terminating calls from a calling party to a subscriber via a privacy screening service when the calling party has a private number, comprising:

determining that the calling party number is known and private;

obtaining a permission from the calling party to override the calling party's service privacy when the calling party number is private;

in response to obtaining the permission, placing a subscriber number in a display text field;

retrieving the subscriber number from the display text field to determine where to terminate the call; and terminating the call to the subscriber.

2. The method of claim 1, wherein a trigger occurs at a switch in response to the call and the trigger is a termination attempt trigger and the switch sends an info analyzed query to a controller in response to the termination attempt trigger.

3. The method of claim 1, further comprising transferring the call to a service node with the subscriber number in a re-directing field;

wherein the subscriber number in the display text field is obtained from the re-directing field.

4. The method of claim 1, wherein the step for obtaining a permission comprises:

playing an announcement to the calling party requesting a permission for overwriting the calling party's service privacy;

collecting digits input by the calling party; and returning the collected digits to a controller.

5. The method of claim 1, wherein the query is triggered by a trigger provisioned on a multi-line hunt group connecting the switch to a service node.

6. The method of claim 1, wherein the response is an analyze_route message with its display text field populated by the subscriber number.

7. A method for managing calls from a calling party to a subscriber who has subscribed to a privacy screening service, comprising:

identifying that an incoming call is from one of a public calling number, a private number or a unknown number; and if the incoming call is from a private number, requesting a permission from a calling party to overwrite the caller's service privacy;

rewriting a presentation indicator in a calling party field of the incoming call as public;

triggering a first query in response to the first query, sending a message with a subscriber number in a display text field;

triggering a second query with the subscriber number in the display text field and the incoming call telephone number in a calling field; and in response to the second query, authorizing the incoming call to be terminated to the subscriber.

8. The method of claim 7, further comprising transferring the incoming call to a service node before triggering the first query with the subscriber number in a re-directing field and wherein a switch connects with the service node through a multi-line hunt group.

9. The method of claim 8, wherein the second query contains a number of the service node in a charge field.

10. The method of claim 7, wherein if the incoming call is a unknown number, requesting the calling party to record the calling party's name;

rewriting a presentation indicator in a calling party field of the incoming call as public;

in response to a query sending a message with the subscriber number in a display text field; and authorizing the coming call to be terminated to the subscriber.

11. The method of claim 10, further comprising transferring the incoming call to a service node for recording the calling party's name, wherein the message in response to the query has the service node's number in a calling party field.

12. The method of claim 7, wherein the determination is performed at a switch control point.

13. The method of claim 7, when the incoming call is from a private number, further comprising:

requesting a permission of the calling party to override the calling party's service privacy;

sending a query for determining an authorization if the calling party permits the request and a refusal if the caller refuses the request;

terminating the incoming call if the calling party permits to overriding the calling party's service privacy.

14. The method of claim 13, wherein the step of requesting permission is performed at a service node.

15. The method of claim 10, when the calling number is an unknown number, further comprising:

directing the incoming call to a service node;

requesting the calling party to record the calling party's name;

after the caller records the calling party's name, sending a query with the subscriber number in the display text field and service node's number in a calling number field; and authorizing a termination of the incoming call to the subscriber.

16. A system for managing calls from a calling party number to a subscriber number for a subscriber who has subscribed to a privacy screening service, comprising:
controller in communication with at least a first and a second switches;
a first trigger for sending a first query to the controller from the first switch when an incoming call from a calling party is received;
a first application package at the second switch for requesting a permission from the calling party to perform one of overriding the calling party's privacy and recording the calling party's name when the calling party number is one of a unknown number and a private number;
a second trigger for sending a second query to the controller from the second switch;
a second application package at the controller that responds to the second query by sending a message with the subscriber number in a display text field and authorizes a termination of the incoming call when receiving a third query from the second switch with the subscriber number in the display text field.

17. The system of claim 16, wherein the trigger at the second switch is a termination attempt trigger, and wherein the second switch sends an info_analyzed query to the controller in response to the termination attempt trigger.

18. The system of claim 16, wherein the system collects at least one digit from the calling party indicating that the calling party allows his or her privacy overridden.

19. The system of claim 16, wherein the second switch retrieves the subscriber number from the display text field of the response received from the controller, and includes the subscriber number in a setup message it sends to a service node.

20. The system of claim 19, wherein the service node retrieves the subscriber number from the setup message and dials a customized dialing plan code followed by the subscriber number, and wherein the customized dialing plan code prompts the third query.

21. The system of claim 16, wherein the controller responds to the third query by returning an analyze_route response with the subscriber number as the called party number and the number of the service node as the charge number.

22. A method for terminating calls from a calling party to a subscriber to a privacy screening service when the calling party has a privacy number comprising:
determining that the calling party number is unknown and private;
routing the call to a service node;
sending a message to the service node, said message having the subscriber number in its display text field;
retrieving the subscriber number from the display text field; and
terminating the call to the subscriber.

23. The method of claim 22, further comprising obtaining the calling party's agreement to override his or her privacy at a controller that sent the message to the service node.

24. The method of claim 22, further comprising obtaining the calling party's agreement to override his or her privacy at the service node.

25. The method of claim 22, wherein the query is triggered by a trigger provisioned on a multi-line hunt group connecting a switch to the service node where the switch has generated the query to cause the message to be sent to the service node.

26. A method for terminating calls from a calling party to a subscriber via a privacy screening service when the calling party has a private number, comprising:
a step for determining that the calling party number is known and private;
a step for obtaining a permission from the calling party to override the calling party's service privacy when the calling party number is private;
a step for, in response to obtaining the permission, sending a message with the subscriber number in a display text field;
a step for retrieving the subscriber number from the display text field; and
a step for terminating the call to the subscriber.

27. The method of claim 26, further comprising a step for transferring the call to a service node before the step for obtaining a permission.

28. The method of claim 26, further comprising a step for triggering a termination attempt at a switch and the switch sends an info_analyzed query to a controller in response to the trigger of the termination attempt.

29. The method of claim 26, further comprising a step of transferring the call to a service node wherein transfer of the call has the subscriber number in a re-directing field; and
wherein the subscriber number in the display text field is obtained from the re-directing field.

30. A service manager, comprising:
means for determining that a call from a calling party to a privacy screening service subscriber is unknown and private;
means for directing the call to a service node;
means for requesting a permission from the calling party to perform one of recording the calling party's name and overwriting the calling party's service privacy;
means for sending a query to a controller from a switch in communication with the service node;
means for responding to the query by sending a message from the controller to the switch with the message's display text field populated with the subscriber number; and
means for terminating the call to the subscriber.

31. The service manager of claim 30, wherein the calls are directed to the service node according to instructions received from the controller.

32. The service manager of claim 30, wherein the query to the controller is an info_analyzed query.

33. The service manager of claim 32, wherein the response from the controller is an analyze_route message.

* * * * *